United States Patent [19]
Inoue et al.

[11] Patent Number: 5,649,245
[45] Date of Patent: Jul. 15, 1997

[54] CAMERA SETTING AND DISPLAY DEVICE

[75] Inventors: Yoshiharu Inoue; Kimio Uematsu, both of Tokyo, Japan

[73] Assignee: Nikon Corporation, Tokyo, Japan

[21] Appl. No.: 524,910

[22] Filed: Sep. 7, 1995

[30]     Foreign Application Priority Data

Sep. 7, 1994 [JP] Japan .................................. 6-214122
  Aug. 31, 1995 [JP] Japan .................................. 7-223013

[51] Int. Cl.⁶ ................................................ G03B 17/18
[52] U.S. Cl. ................................... 396/291; 396/299
[58] Field of Search ............................. 354/471, 474, 354/475, 289.1, 289.12, 442; 396/291, 292, 287, 281, 299, 297

[56]           References Cited

U.S. PATENT DOCUMENTS 4,455,068   6/1984   Izuhara .................. 354/289.12 X
  5,298,936   3/1994   Akitake et al. ................ 354/471
  5,416,556   5/1995   Suzuki et al. ............... 354/442 X

*Primary Examiner*—W. B. Perkey

[57]               ABSTRACT

A camera setting and display device has a visual display and includes setting members that set corresponding photographic information in a camera. A storage device included in the camera has a first storage area that selectively stores a first set of photographic information from the setting members and a second storage area that selectively stores a second set of photographic information, different from the first set of photographic information, from the setting members. A visual display of the camera setting and display device has a first display section corresponding to the first storage area that displays the first set of photographic information and a second display section corresponding to the second storage area that displays the second set of photographic information. A permission member selects either the first display section and the second display section for display on the visual display.

17 Claims, 21 Drawing Sheets

FIG. 15

| DCMODE | |
|---|---|
| 0 | NO ACCESS / NO STORAGE OF RAM DATA |
| 1 | RAM DATA IS ACCESSED |
| 2 | RAM DATA IS STORED |

FIG. 16

OPERATION BUTTON INFORMATION

| OPERATION BUTTON \ FLAG | 0 | 1 |
|---|---|---|
| OPERATION BUTTON 1 | OPERATION BUTTON 1 IS PRESSED | OPERATION BUTTON 1 IS NOT PRESSED |
| OPERATION BUTTON 2 | OPERATION BUTTON 2 IS PRESSED | OPERATION BUTTON 2 IS NOT PRESSED |
| OPERATION BUTTON 14 | OPERATION BUTTON 14 IS PRESSED | OPERATION BUTTON 14 IS NOT PRESSED |
| OPERATION BUTTON 15 | OPERATION BUTTON 15 IS PRESSED | OPERATION BUTTON 15 IS NOT PRESSED |

FIRST INFORMATION SETTINGS IN RAM

| QSMODE: | FEED MODE |
|---|---|
| AFMODE: | AF MODE |
| AEMODE: | EXPOSURE MODE |
| AMPMODE: | PHOTOMETRIC MODE |
| SYNCMODE: | SYNCHRO MODE |

FIG. 17

SECOND INFORMATION SETTINGS RAM

| ISOMODE: | FILM SPEED |
|---|---|
| AEHS: | EXPOSURE COMPENSATION |
| SBHS: | STROBE COMPENSATION |
| AEBKT: | SHIFT OF EXPOSURE BRACKETING |
| SBBKT: | SHIFT OF STROBE BRACKETING |

FIG. 18

| COMBINATION SETTING STORAGE AREA A (RAM) ||
|---|---|
| MEMORY A1 | QSMODE |
| | AFMODE |
| | AEMODE |
| | AMPMODE |
| | SYNCMODE |
| MEMORY A2 | QSMODE |
| | AFMODE |
| | AEMODE |
| | AMPMODE |
| | SYNCMODE |
| MEMORY A3 | QSMODE |
| | AFMODE |
| | AEMODE |
| | AMPMODE |
| | SYNCMODE |

FIG. 19

| COMBINATION SETTING STORAGE AREA B (ROM) ||
|---|---|
| MEMORY B0 | QSMODE |
| | AFMODE |
| | AEMODE |
| | AMPMODE |
| | SYNCMODE |

FIG. 20

QRADR DISPLAY
| QRADR VALUE | DISPLAY |
|---|---|
| QRADR=0 | 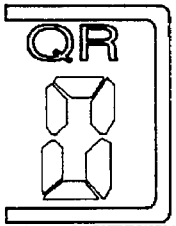 |
| QRADR=1 | 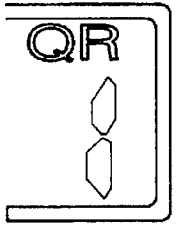 |
| QRADR=2 | 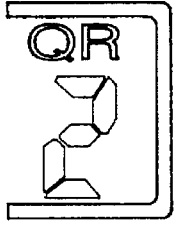 |
| QRADR=3 | 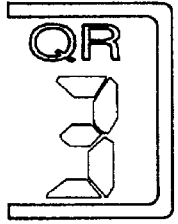 |
| QRADR=4 | 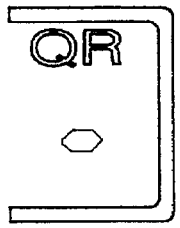 |
FIG. 21

| QSMODE VALUE | DISPLAY |
|---|---|
| QSMODE =0 | S |
| QSMODE=1 | H |
| QSMODE=2 | L |
| QSMODE=3 | S / SL |

FIG. 22

| AFMODE VALUE | DISPLAY |
|---|---|
| AFMODE=0 | AF S |
| AFMODE=1 | AF C |
| AFMODE=2 | MF |

FIG. 23

| AEMODE VALUE | DISPLAY |
|---|---|
| AEMODE=0 | P |
| AEMODE=1 | S |
| AEMODE=2 | A |
| AEMODE=3 | M |

FIG. 24

| AMPMODE VALUE | DISPLAY |
|---|---|
| AMPMODE=0 | |
| AMPMODE=1 | |
| AMPMODE=2 | |

FIG. 25

| SYNCMODE VALUE | DISPLAY |
|---|---|
| SYNCMODE=0 |  |
| SYNCMODE=1 | 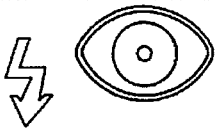 |
| SYNCMODE=2 |  |
| SYNCMODE=3 |  |
FIG. 26

CAMERA SETTING AND DISPLAY DEVICE

BACKGROUND OF THE INVENTION

1. Field of the Invention

The present invention relates to a camera setting and display device. More particularly, the present invention relates to a camera setting and display device having two display sections wherein one display section displays a plurality of camera information which is often changed by a photographer.

2. Description of the Related Art

Conventionally known cameras which are capable of setting multiple information include an information setting device which sets multiple information desired by a photographer. The conventional setting device stores the information in a storage device of the camera for later access. There are also information setting devices which access certain fixed combinations of information settings according to an operation of the photographer.

However, in conventional information setting devices, if the settings are changed for any reason after the setting information has been accessed, the photographer could perform photography using a mistaken combination of settings. Because the photographer is unaware of the change in settings, the photograph may not be taken as intended.

Also, in conventional information setting devices, when an access operation mode or a storage operation mode is entered, the modes may not be canceled in progress. In a worst case scenario, the current setting information is deleted.

SUMMARY OF THE INVENTION

An object of the present invention is to provide a camera information setting device which can continually check setting information which has been set in a camera.

It is another object of the present invention to provide a camera having an access operation mode and a storage mode, wherein a photographer is able to cancel the access operation mode or the storage operation mode through a simple operation without losing current setting information of the camera.

Objects of the present invention are achieved through a camera setting and display device which is equipped with a plurality of setting members including a command dial, operation buttons for setting photographic information, a storage device for storing photographic information set by the command dial and the operation buttons, and an external display panel which displays the photographic information and information relating to a storage area of the storage device.

Objects of the present invention are also achieved through a camera setting and display device which is equipped with first and second display sections respectively relating to first and second storage areas of a storage device, wherein the first storage area includes photographic information which is different from photographic information stored in the second storage area.

Moreover, objects of the invention are achieved by providing a camera setting and display device having a storage device that includes a first storage area which stores first multiple photographic information as a first set of information, and a second storage area which stores second multiple photographic information different from the first multiple photographic information as a second set of information.

Objects of the invention are further achieved by a camera setting and display device having at least one type of photographic information from among a plurality of photographic information relating to film feed, focusing, exposure, photometry, and camera flash contained in a first storage area.

Objects of the invention are also achieved through a camera setting and display device equipped with: a storage device which stores multiple photographic information including one set of information; a first operation member which generates a permission signal permitting access to the one set of information stored in the storage device; a second operation member which generates a first signal when moved to a specified position and a second signal when not moved to the specified position; and a control device which selects the one set of information from the storage device according to the specified position upon receipt of the permission signal and the first signal, and which cancels permission for accessing the information upon receipt of the permission signal and the second signal.

Moreover, objects of the invention are achieved through a camera setting and display device wherein a first operation member is a half-press switch, and a second operation member is a dial switch which can be rotated.

Objects of the invention are also achieved through a camera setting and display device which is equipped with setting devices which set multiple photographic conditions as one set of information, a storage device which stores the multiple photographic conditions as the one set of information, a first operation member which generates a permission signal which permits storage to the storage device, an operation member which generates a first signal when moved to a specified position and a second signal when not moved to the specified position, and a control device which stores the set of information in the storage device according to the specified position upon receiving the permission signal and the first signal, and which cancels storage to the storage device upon receiving the permission signal and the second signal.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 15 is a diagram which illustrates DCMODE information.

FIG. 16 is a diagram which illustrates Operation Button information.

FIG. 17 is a diagram which illustrates the contents of First Information Settings in RAM.

FIG. 18 is a diagram which illustrates the contents of Second Information Settings in RAM.

FIG. 19 is a diagram which illustrates the contents of Combination Setting Storage Area A in RAM.

FIG. 20 is a diagram which illustrates the contents of Combination Setting Storage Area B in ROM.

FIG. 21 is a diagram which illustrates a QRADR Display, which corresponds to the RAM of MCU 7.

FIG. 22 is a diagram which illustrates a QSMODE display based upon information in the RAM of MCU 7.

FIG. 23 is a diagram which illustrates an AFMODE display based upon information in the RAM of MCU 7.

FIG. 24 is a diagram which illustrates an AEMODE display based upon information in the RAM of MCU 7.

FIG. 25 is a diagram which illustrates an AMPMODE display based upon information in the RAM of MCU 7.

FIG. 26 is a diagram which illustrates a SYNCMODE display based upon information in the RAM of MCU 7.

DESCRIPTION OF THE PREFERRED EMBODIMENTS

Figure 1:
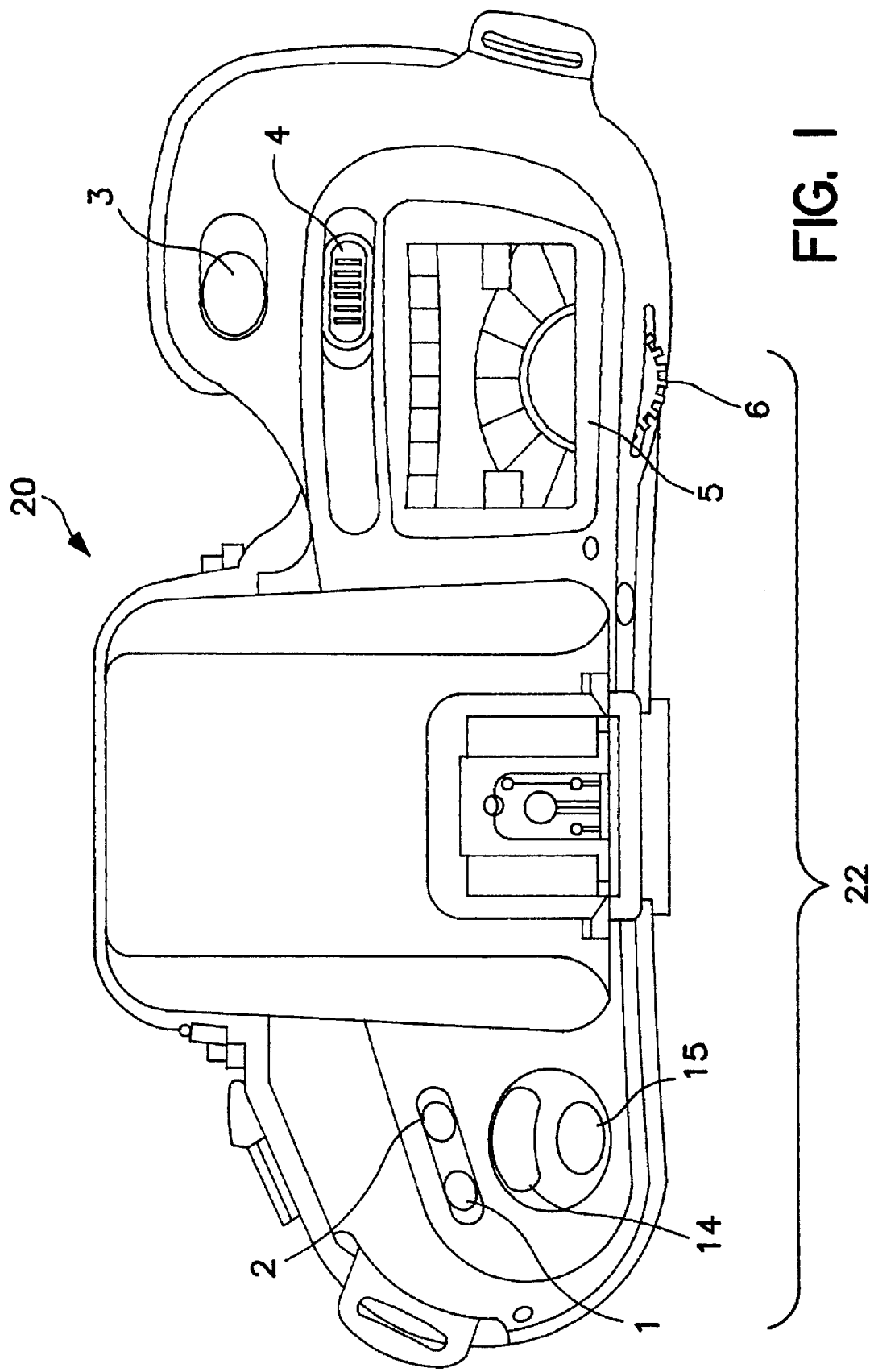
FIG. 1 is an elevated top view of a single lens reflex camera having an external camera display according to a preferred embodiment of the present invention.

Reference will now be made in detail to the preferred embodiments of the present invention, examples of which are illustrated in the accompanying drawings, where like reference numerals refer to like elements throughout.

Turning now to the drawings and more particularly to FIG. 1, the preferred embodiments of the present invention are shown and described. FIG. 1 is an outline diagram of a single-lens reflex camera which illustrates a preferred embodiment of the present invention.

FIG. 1 illustrates camera 20 having camera setting and display device 22 for controlling operation thereof. Camera setting and display device 22 includes operation button 1 for selecting operations such as feed mode, autofocus (AF) mode, exposure mode, photometric mode, and synchro mode, which are all read as one set of information. These operations are for information which is changed quite frequently by a photographer.

In a preferred embodiment, as illustrated in FIG. 17, feed mode, autofocus mode, exposure mode, photometric mode, and synchro mode, which are changed relatively frequently by the photographer, are stored in first information settings in a RAM of MCU 7. This is described below as the first information settings.

Also, in a preferred embodiment, as illustrated in FIG. 18, film speed, exposure compensation, strobe compensation, shift of exposure bracketing, and shift of strobe bracketing, which are not often changed by the photographer once set, are stored in the second information settings in the RAM of the MCU 7. This is described below, as the second information settings.

Returning now to FIG. 1, operation button 2 is used for storing operations in a camera 20. Through operation of operation button 2, the first information settings, which are changed relatively frequently by the photographer, are stored as one set of information. Operation button 1 is used to later recall the first information settings. Shutter release button 3 is a commonly known device which executes an autofocus operation and a photometric operation when halfway depressed, and executes a photographic operation when fully depressed. Main switch 4 is a switch for turning camera 20 on. External LCD panel 5 is a liquid crystal display panel which displays multiple photographic information. LCD panel 5 is formed with multiple photographic information sections and displays photographic information which is stored in first information settings in the RAM and second information settings in the RAM.

Figure 3:
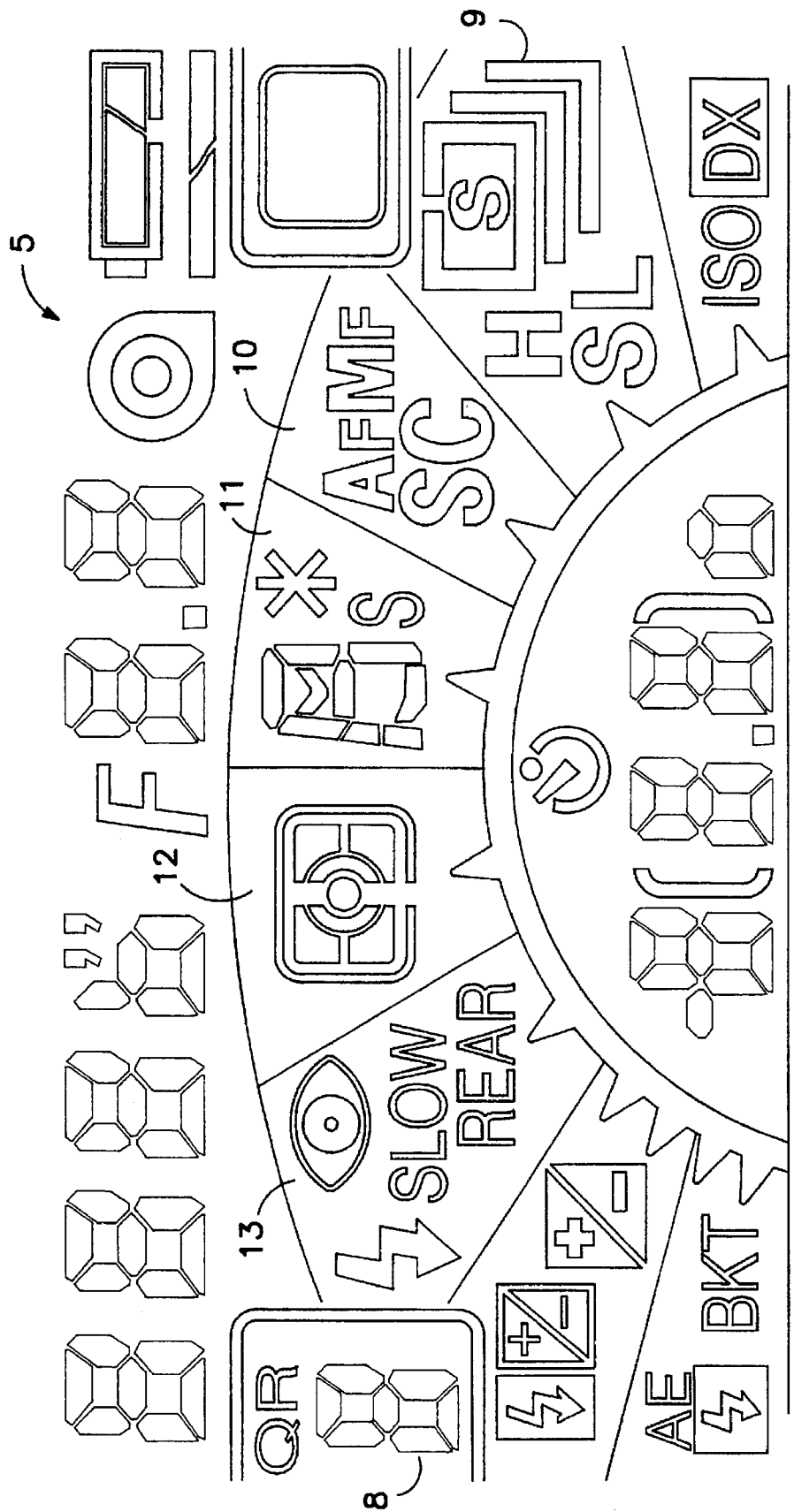
FIG. 3 illustrates an illuminated LCD panel of the external camera display in FIG. 1.

FIG. 3 illustrates an enlargement of external LCD panel 5, and illustrates a condition where all display symbols are displayed. External LCD panel 5 includes: QRADR display section 8, which displays information relating to the memory being used; feed mode display section 9, which displays information relating to film feed; AF mode display section 10, which displays information relating to autofocusing; exposure mode display section 11, which displays information relating to exposure; photometry mode display section 12, which displays information relating to photometry; and synchro mode display section 13, which displays information relating to flash photography. Each display section is capable of displaying a plurality of settings with a plurality of display symbols. A detailed explanation of the display sections will be provided further below.

Returning to FIG. 1, command dial 6 is a member which, in conjunction with operation buttons 14 or 15 described below, performs functions such as blinking a selected multiple display symbol of external LCD panel 5 and selecting a setting for a blinking display symbol. Alternatively, or in conjunction therewith, command dial 6 selects the multiple display symbol through an LCD arrow (not shown in FIG. 5). Command dial 6 rotates both clockwise and counter-clockwise to cycle through selected display sections. Operation button 14 is depressed to select one section from among multiple sections of external LCD panel 5 in conjunction with command dial 6. After a display section is selected by operation button 14 and command dial 6, a previously selected display symbol within the selected display section begins to blink. However, the symbol only blinks while the corresponding display section is being selected. Operation button 15 is a member for selecting a display symbol and thereby display contents within a display section. While operation button 15 is depressed, display contents of the selected section are continually selected through command dial 6. The selected display symbol within the selected display section blinks to indicate the selection until operation button 15 is released.

Figure 2:
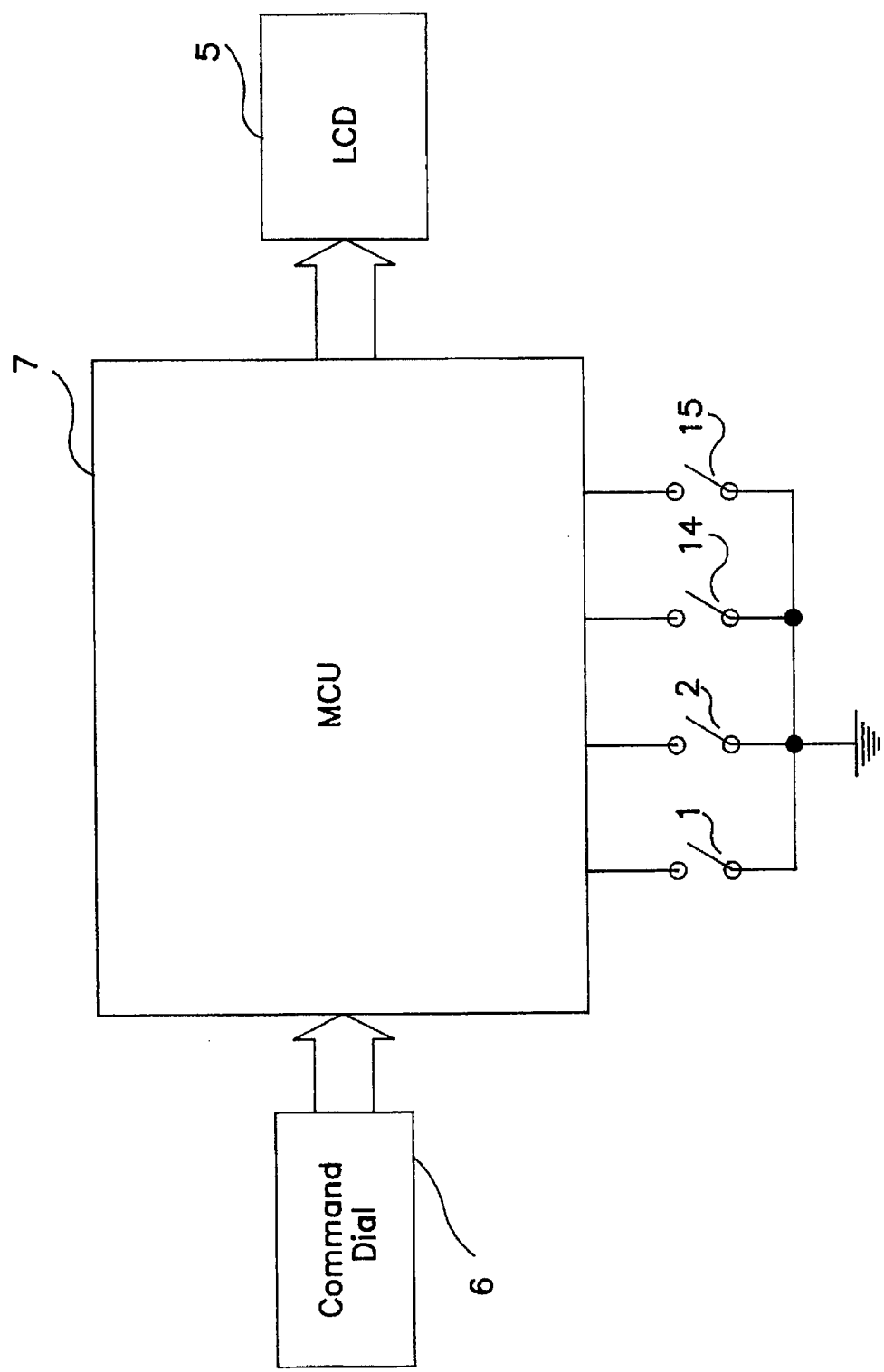
FIG. 2 is a block diagram which illustrates a control circuit of the camera illustrated in FIG. 1.

FIG. 2 is a block diagram which illustrates a control circuit for camera 20 in FIG. 1. MCU 7 controls the entirety of camera 20 and has multiple RAMs. Operation buttons 1, 2, 14 and 15 and command dial 6 are all connected to an input port of MCU 7.

FIG. 16 is a diagram which illustrates photographic information corresponding to operation buttons 1,2, 14 and 15. The respective operating conditions of operation buttons 1, 2, 14 and 15 are expressed by flags in the RAM of MCU 7.

When respective operation buttons are depressed, flags which correspond to the respective operation buttons become 0, and when the respective operations buttons are not depressed, the flags which correspond to the respective operation buttons become 1. Immediately after main switch 4 is turned ON, the flags are set to 0, even when the respective operation buttons are not depressed. Also, command dial 6 outputs a "1" signal when rotated clockwise, a "1" signal when rotated counterclockwise, and a "–0" signal when not operated.

MCU 7 detects an operating condition of operation buttons 1, 2, 14 and 15 as well as the rotation direction and rotation amount of command dial 6 as detection results. MCU 7 also controls display symbol of external LCD panel 5 based upon these detection results.

FIGS. 21 through 26 will now be used to explain the mode display sections from feed mode display section 9 through synchro mode display section 13 of external LCD panel 5 in detail.

During operation, MCU 7 first causes respective sections of external LCD panel 5 to blink by receiving an input from operation button 14 and a specified amount of rotation from command dial 6. That is, when a desired section of external LCD panel 5 has been caused to blink (by rotating command dial 6 when operation button 14 is continually depressed) the photographer is able to select a desired section by stopping rotation of command dial 6 and releasing operation button 14. Then, MCU 7 receives a change selection in the setting of a selected section by receiving input from operation button 15 and a specified amount of rotation of command dial 6 while the selected sections is blinking.

In other words, the photographer is able to change contents (represented by display symbols) of a desired section by rotating command dial 6 when operation button 15 is continually depressed and is able to change contents of the desired section by stopping rotation of command dial 6 and releasing operation button 15 when a desired symbol for resetting is displayed.

As illustrated in FIG. 22, there are four types of display symbols in feed mode display section 9. When QSMODE, which is a variable in RAM of MCU 7, is set to 0 (through operation of operation button 14, operation button 15, and command dial 6) camera 20 is in a mode which photographs one shot at a time when shutter release button 3 is fully depressed. When QSMODE is set to 1, camera 20 is in a mode which performs a release operation continuously by way of shutter release button 3 being continuously and fully depressed. When QSMODE is set to 2, camera 20 is in a mode which performs the release operation continuously but at a slower speed than when QSMODE is set to 1. In this case, shutter release button 3 is also continuously and fully depressed. When QSMODE is set to 3, camera 20 is set to a quiet mode which performs control so that operation noise relating to the release operation is at a minimum.

As illustrated in FIG. 22, a display symbol which corresponds to set QSMODE contents is displayed in feed mode display section 9 of external LCD panel 5. A value which corresponds to the display symbol when operation button 15 has been released is stored in QSMODE.

As illustrated in FIG. 23 there are three types of display symbols in AF mode display section 10. When a display symbol of AF mode display section 10 is blinking, as in the case where AFMODE which is a variable in RAM of MCU 7, has been set to 0, camera 20 is set to a focus mode which gives focus priority over release. When AFMODE is set to 1, camera 20 is set to a release priority mode which gives release priority over focus. When AFMODE is set to 2, camera 20 is set to a manual focus mode which does not perform autofocus. As illustrated in FIG. 23, a display symbol which corresponds to set AF mode contents is displayed in AF mode display section 10.

As illustrated in FIG. 24, there are four types of display symbols in exposure mode display section 11. When a display symbol of exposure mode display section 11 is blinking, as in the case where AEMODE, which is a variable in RAM of MCU 7 has been set to 0, camera 20 is in auto mode which automatically determines a shutter period and a shutter aperture. When AEMODE is set to 1, camera 20 is in a shutter priority mode which performs exposure at a shutter period set by the photographer. When AEMODE is set to 2, camera 20 is in an aperture priority mode which performs exposure at an aperture value set by the photographer, and when AEMODE is set to 3, camera 20 is in a mode which performs exposure with a combination of a shutter period and an aperture value set by the photographer.

As illustrated in FIG. 24, a display symbol which corresponds to the set AEMODE contents is displayed in exposure mode display section 11.

As illustrated in FIG. 25, there are three types of display symbols in the photometry mode display section 12. In the case where AMPMODE, which is a variable in RAM of MCU 7, has been set to 0, i.e. when a display symbol of photometric mode display section 12 is blinking, camera 20 is in a photometric mode which evaluates the entire image plane and obtains a photometry value. When AMPMODE is set to 1, camera 20 is in a center-weighted photometric mode which obtains a photometry value of the center section of the image plane, and when AFMODE is set to 2, camera 20 is in a spot photometric mode which obtains a photometry value of a narrow portion of a center section of the image plane. As illustrated in FIG. 25, a display symbol which corresponds to the set AMPMODE contents is displayed in photometric mode display section 12.

As illustrated in FIG. 26, there are four types of display symbols in synchro mode display section 13. In the case where SYNCMODE, which is a variable in RAM of MCU 7 has been set to 0, i.e. when a display symbol of synchro mode display section 13 is blinking, camera 20 is in a mode which performs normal flash control. When SYNCMODE is set to 1, camera 20 is in a red-eye reduction mode which performs a red-eye reduction flash in advance of a flash from a flash device. When SYNCMODE is set to 2, camera 20 is in a mode which performs photography during a low speed shutter period, and when SYNCMODE is set to 3, camera 20 is in a rear blind synchro mode which performs flash from the flash device after completion of shutter release. As illustrated in FIG. 26, a display symbol which corresponds to the set SYNCMODE contents is displayed in synchro mode display section 13.

Figure 4:
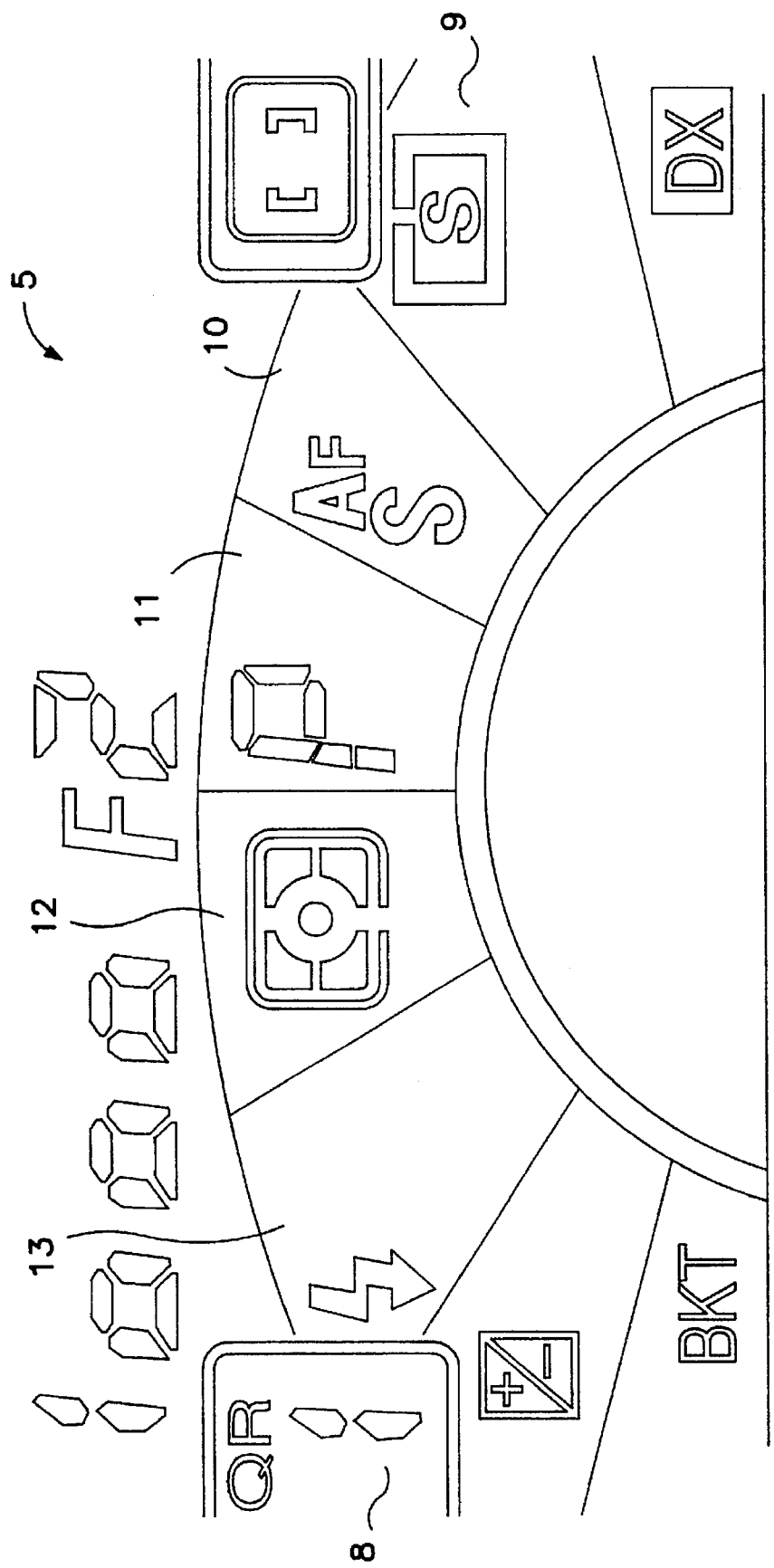
FIG. 4 illustrates an illuminated LCD panel of the external camera display of FIG. 1 when the combination of settings of memory A1 has been accessed.

FIG. 4 illustrates an example of the aforementioned operations. FIG. 4 illustrates that the feed mode (QSMODE=0) performs photography one shot at time when shutter release button 3 has been fully depressed; the AF mode (AFMODE=0) gives focus priority over release; the exposure mode (AEMODE=0)in auto mode; the photometric mode (AMPMODE=0) evaluates an entire image plane and obtains a photometric value; and synchro mode (SYNCMODE=0) performs normal flash control.

MCU 7 stores the photometric information outlined above as one set of information by receiving input from operation button 2 and a specified amount of rotation from command dial 6. That is, after the photographic information has been set, the photographer is able to store one set of photographic information in a desired area of memory, i.e. one of memories A1~A3, of combination storage area A (RAM) (FIG. 19) by rotating command dial 6 when operation button 2 is continuously depressed. Also, the photographer is able to access the contents stored in memories A1~A3 of storage area A (RAM) (FIG. 19) and memory B0 of combination storage area B (ROM) (FIG. 20) by operating operation button 1 and command dial 6.

QRADR display section 8 displays the accessed memory, and has five types of displays as illustrated in FIG. 21. When QRADR, which is a variable in RAM of MCU 7, is 0, memory B0 of storage area B (ROM) (FIG. 20) is being accessed. The photographic information is stored as one set of information in this memory B0. When memory B0 has been accessed, the QRADR display a symbol section 8 displays "0" as the stored contents are displayed on external LCD panel 5. Memory B0 is a read-only memory, so it is not able to store photographic information set by the photographer.

When QRADR is set to 1, QRADR display a symbol section 8 displays "1", and the photographic information stored in memory A1 is displayed on external LCD panel 5. When QRADR is set to 2, QRADR display a symbol section 8 displays "2", and the photographic information stored in memory A2 is displayed on external LCD panel 5. When QRADR is 3, QRADR display section 8 displays a symbol "3", and the photographic information stored in memory A3 is displayed on external LCD panel 5. A QRADR of 4 indicates that neither memories A1~A3 nor memory B0 can be accessed. The purpose of QRADR 4 is to escape from this access mode.

When QRADR, which is a variable in RAM of MCU 7, has been set to any number from 1 to 3 by the operation of operation button 2 and command dial 6, multiple photographic information is stored as one set of information in the QRADR section of the RAM of MCU 7. A QRADR setting of 4 indicates that neither memories A1~A3 nor memory B0 is selected. This is for escaping from storage mode when one would like to cancel the storage of a set of photographic information which has been set. Also, when QRADR is 4, a symbol "-" is displayed in QRADR display section 8.

MCU 7 performs control so that the display of QRADR display section 8 is turned off when the contents of the accessed memory and first setting information displayed on external LCD panel 5 differ through operation of operation button 15 and command dial 6.

Figure 5:
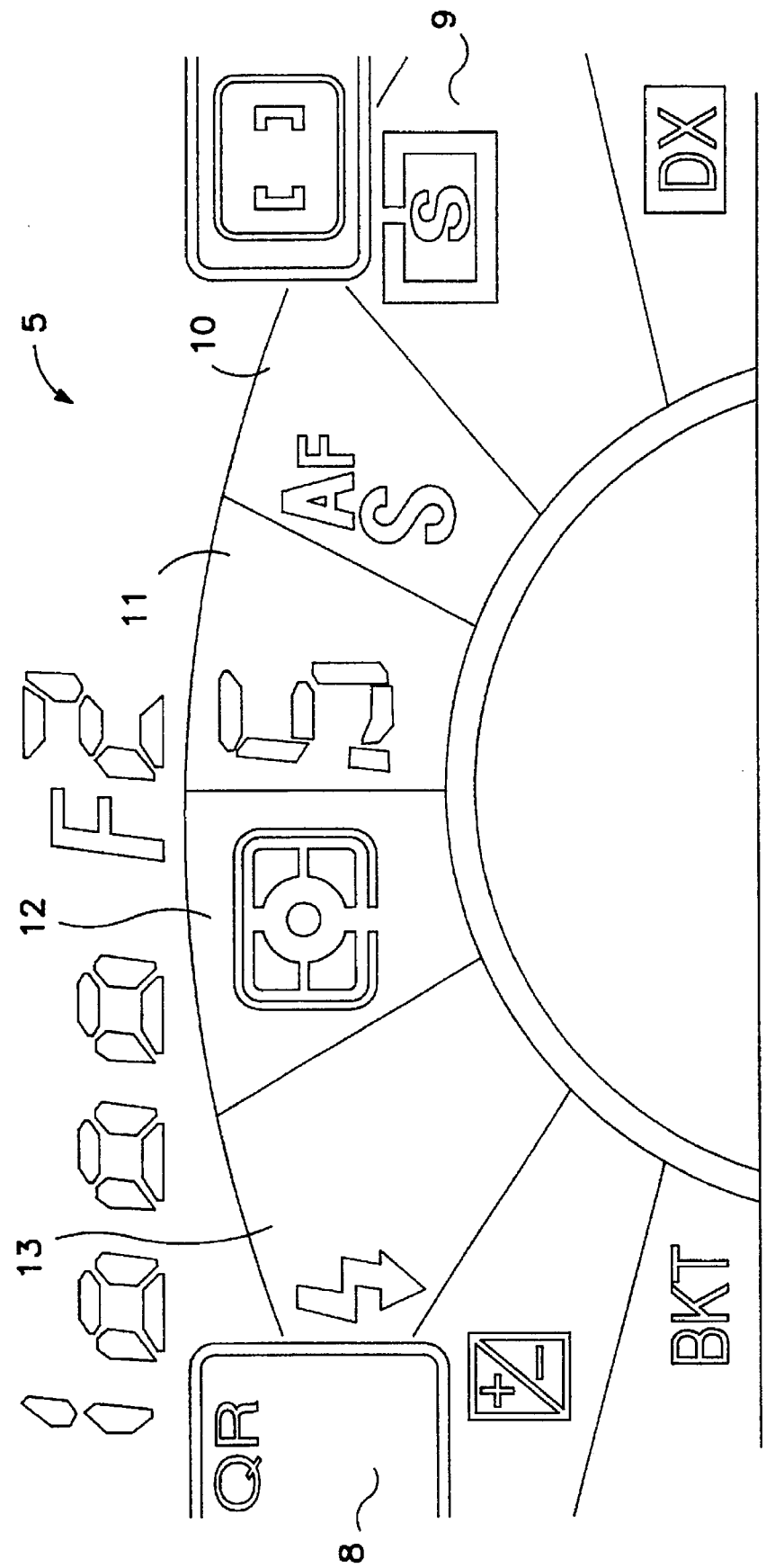
FIG. 5 illustrates an illuminated LCD panel of the external camera display of FIG. 1 when an exposure mode has been changed and after the combination of memory A1 has been accessed.

That is, as illustrated in FIG. 4, when QRADR is 1 (i.e., when the contents of memory A1 are displayed) and the exposure mode (display section 11) has been changed from auto mode to shutter priority mode, as illustrated in FIG. 5, MCU 7 turns off QRADR display section 8 as exposure mode display section 11 is changed.

Figure 6:
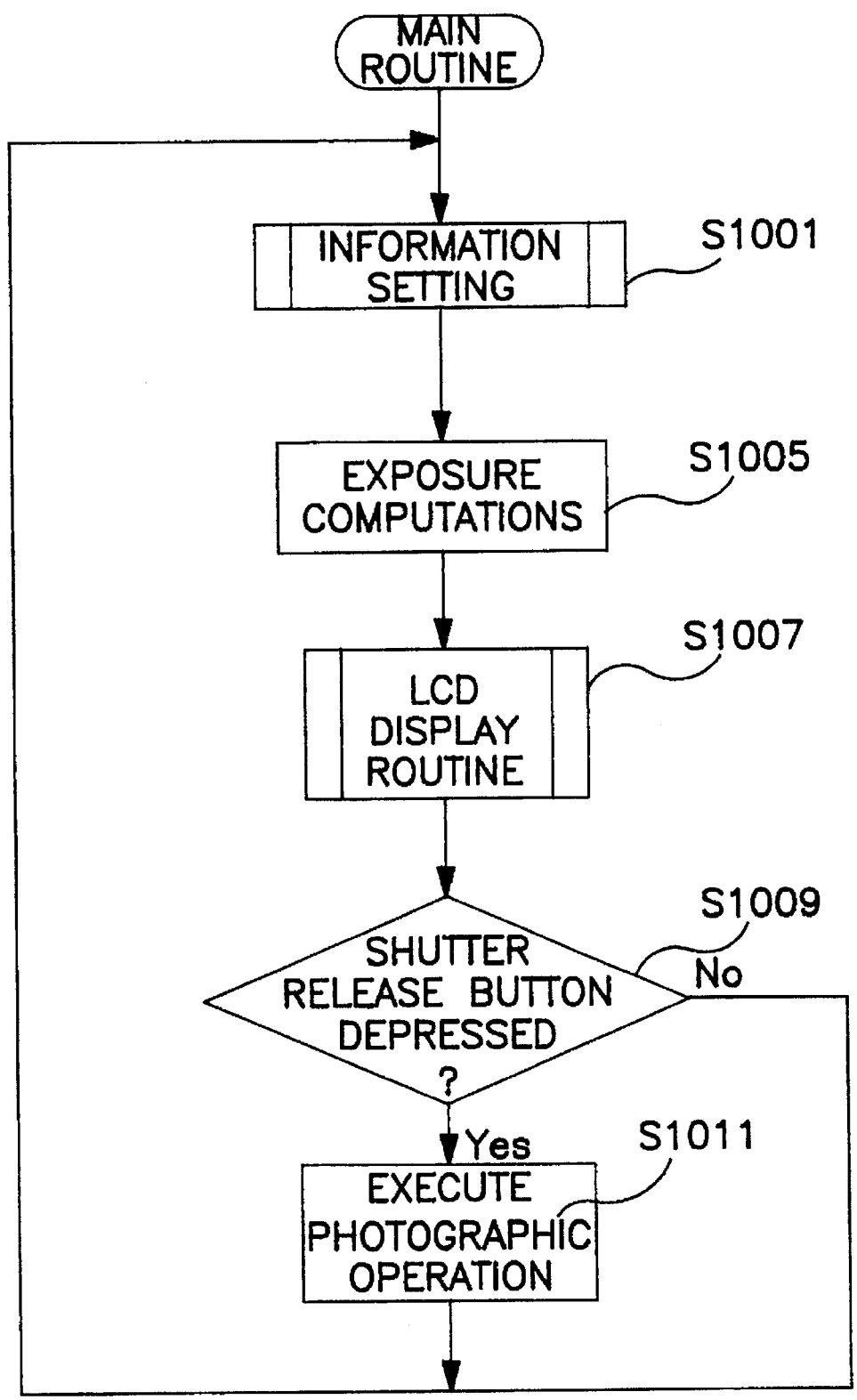
FIG. 6 is a flowchart of a Main Routine of the camera illustrated in FIG. 1.

Control by MCU 7 of camera 20 according to the present embodiment will be explained below while referring to flowcharts of FIGS. 6 through 14. FIG. 6 is the main flowchart of MCU 7. The main flowchart of FIG. 6 is executed by turning on main switch 4. The main flowchart repeats a loop until main switch 4 is turned off.

MCU 7 performs information settings according to operations by operation buttons 1, 2, 14 and 15 and command dial 6 (Step 1001). MCU 7 then performs exposure computations (Step 1005), and displays the information set in Step 1001 on external LCD panel 5 through an LCD Display routine (Step 1007). MCU 7 then determines whether shutter release button 3 has been fully depressed (Step 1009). If shutter release button 3 is fully depressed, MCU 7 executes a photographic operation (Step 1011).

Figure 7:
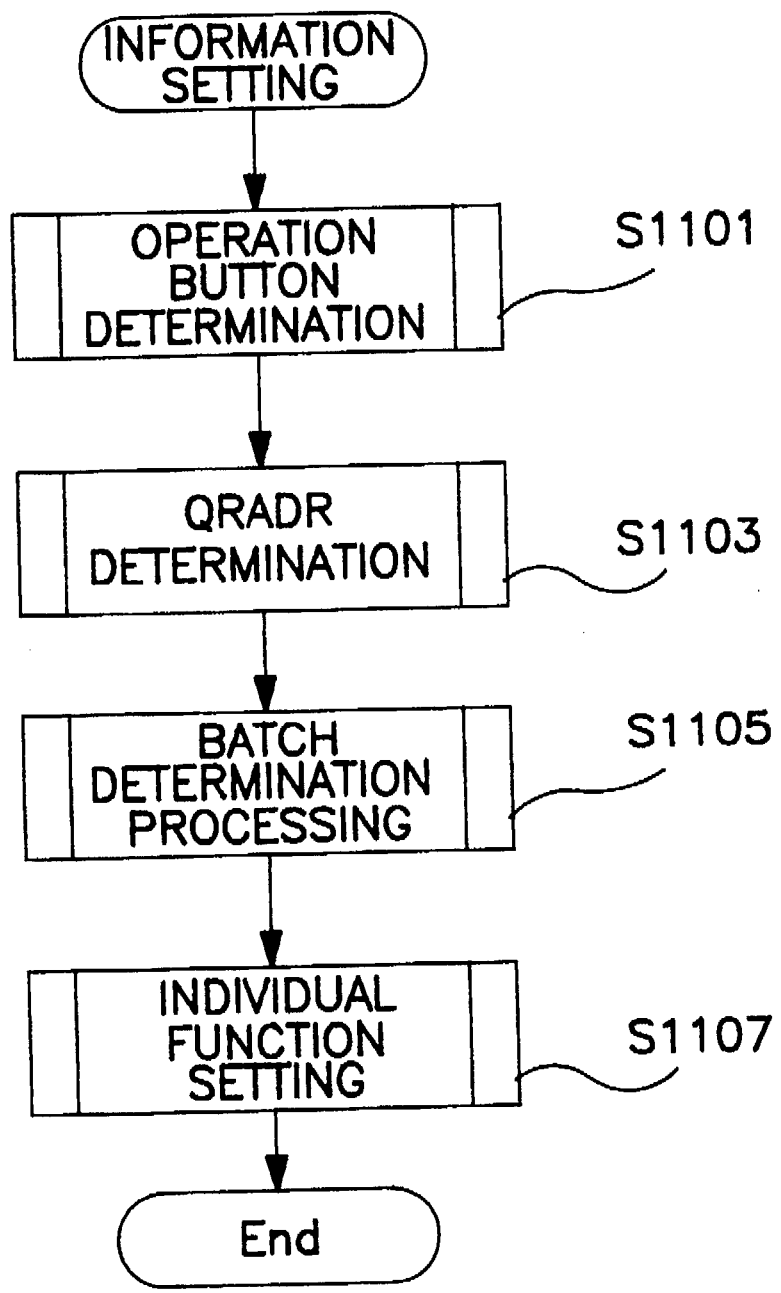
FIG. 7 is a flowchart of the Information Setting subroutine in FIG. 6.
Figure 8:
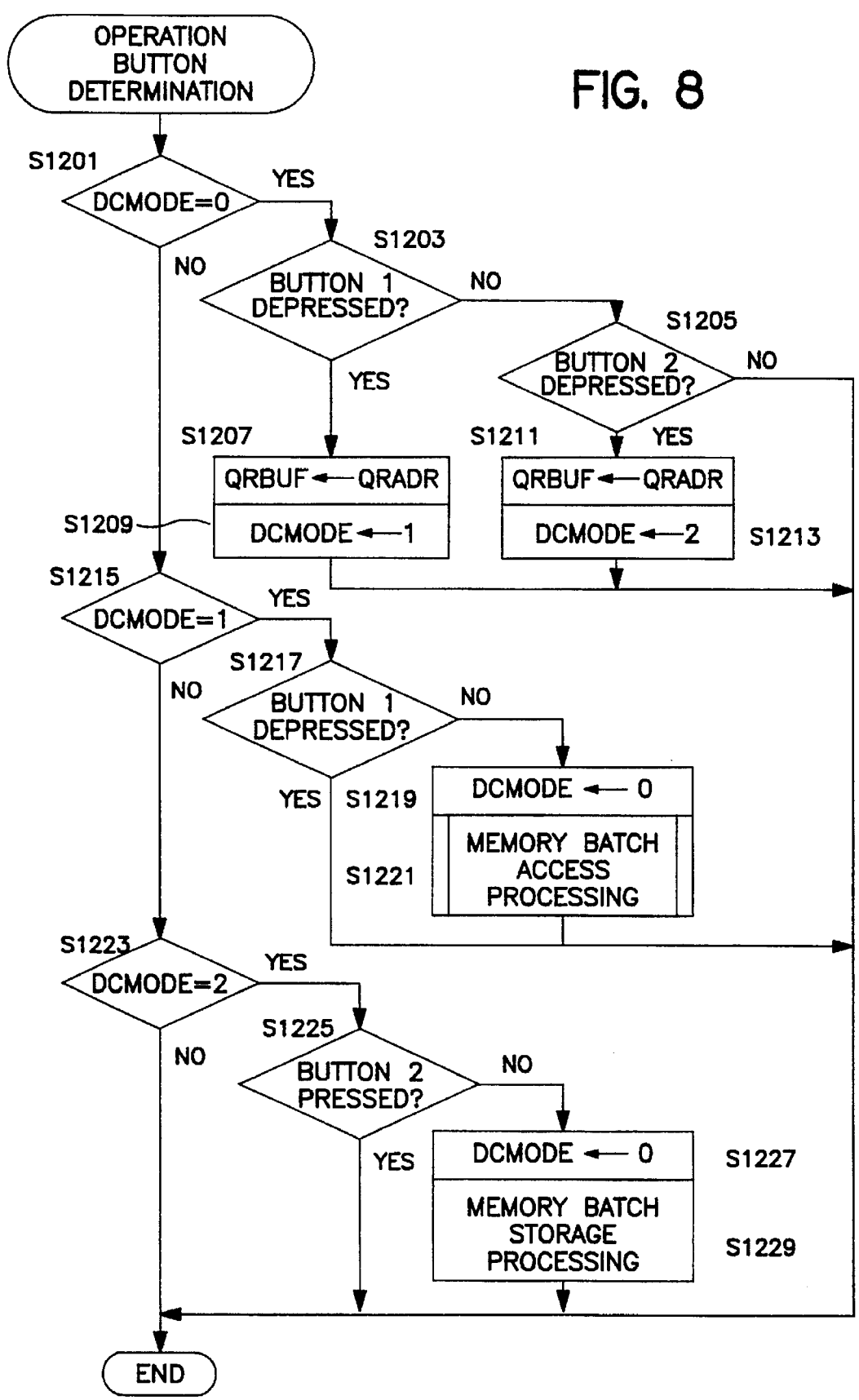
FIG. 8 is a flowchart of the Operation Button Determination in FIG. 7.

Next, the subroutines of Step 1001 and Step 1007 will be explained. FIG. 7 is a subroutine of Step 1001 of the main flowchart illustrated in FIG. 6. MCU 7 first decides whether operation buttons 1 and 2 are being operated (Step 1101). FIG. 8 explains Step 1101 in detail, and the explanation continues below with reference to FIG. 8.

In FIG. 8, MCU 7 determines whether DCMODE, which is a RAM of MCU 7, is 0 (Step 1201). FIG. 15 explains the contents of DCMODE. When DCMODE is 0, neither accessing nor storage of RAM data is performed. When DCMODE is 1, RAM data is accessed, and when DCMODE is 2, RAM data is stored. Turning back to FIG. 8, MCU 7 decides whether operation button 1 is depressed when it has been decided in Step 1201 that DCMODE is not accessing or storing data (Step 1203). MCU 7 then temporarily stores the contents stored by QRADR in QRBUF when operation button 1 is depressed (Step 1207). QRBUF is part of the RAM of MCU 7 and is used to back up the contents stored by QRADR. Accordingly, data is read when operation button 1 is depressed, so that MCU 7 sets DCMODE to 1 (Step 1209).

If the determination in Step 1203 is NO, i.e. if button 1 is not depressed, MCU 7 decides whether operation button 2 is depressed. If button 2 is depressed (Step 1205), MCU 7 then temporarily stores the contents stored by QRADR in QRBUF (Step 1211). Accordingly, data is stored when operation button 2 is depressed, and MCU 7 sets DCMODE to 2 (Step 1213).

If in Step 1201 it is determined that the determination for DCMODE=0 is NO, then flow proceeds to Step 1215. In Step 1215, it is determined whether DCMODE=1. In the same way as in Step 1203 above, MCU 7 determines whether operation button 1 is being operated when DCMODE=1, i.e. during the reading condition (Step 1217). When MCU 7 has decided that operation button 1 is not depressed, MCU 7 sets DCMODE to 0 in Step 1219. This sets a condition where neither accessing nor storing is performed. Next, MCU 7 performs memory batch access processing in Step 1221. In this case, the flowchart of FIG. 8 is completed when operation button 1 is depressed.

However, if a determination is NO in Step 1215, i.e. when DCMODE is not equal to 1, the process proceeds to Step 1223. In the same way as Step 1217, MCU 7 then determines whether operation button 2 is depressed when DCMODE is 2, i.e. during the storage condition (Step 1225). When it is determined by MCU 7 that operation button 2 is not depressed, MCU 7 sets DCMODE to 0 in Step 1227, i.e. MCU 7 sets a condition where neither accessing nor storing is performed, and then performs memory batch storage processing (Step 1229). In this case, the flowchart of FIG. 8 is completed when operation button 2 is depressed.

Figure 13:
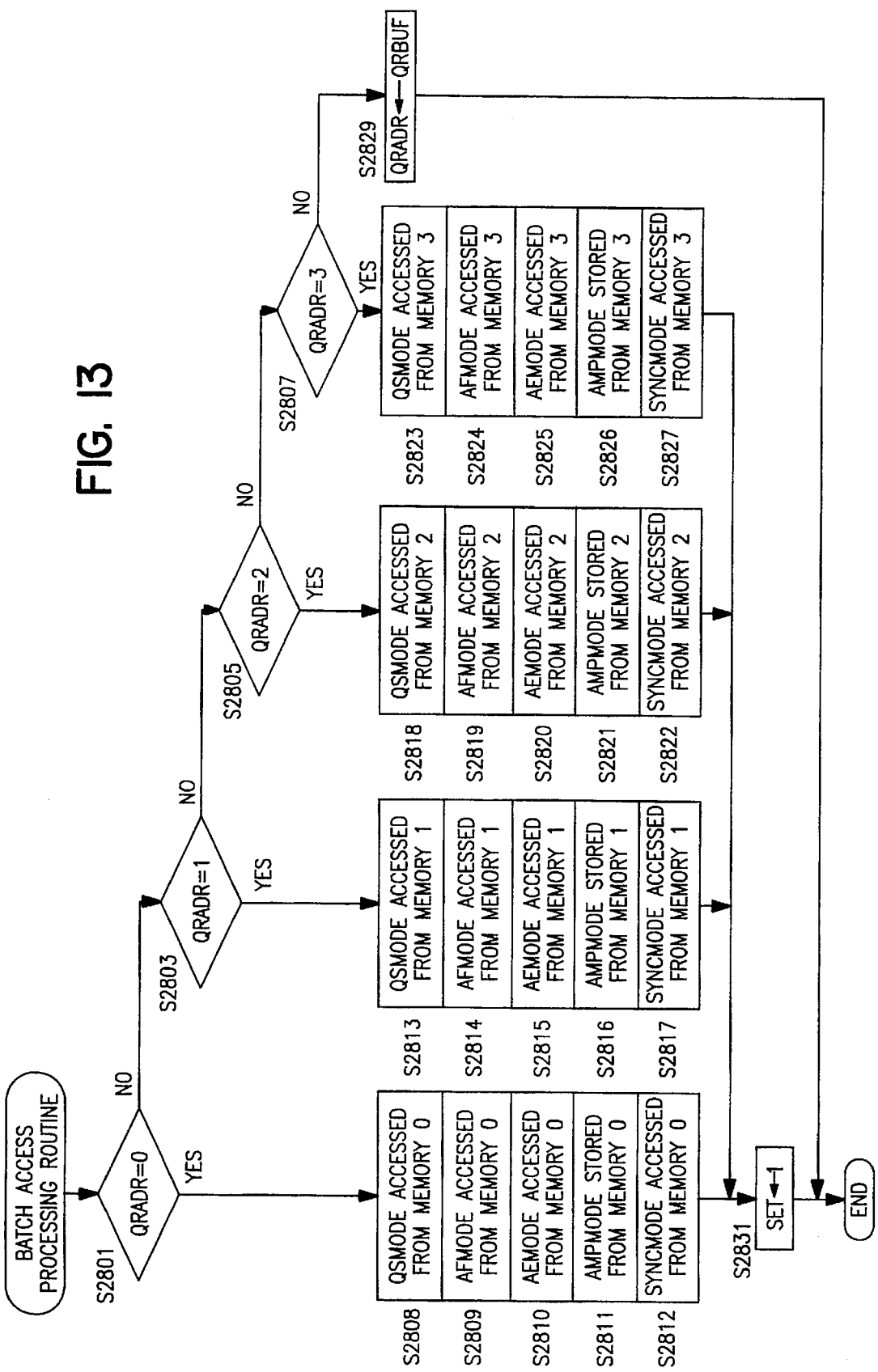
FIG. 13 is a flowchart of a Batch Access Processing Routine.
Figure 14:
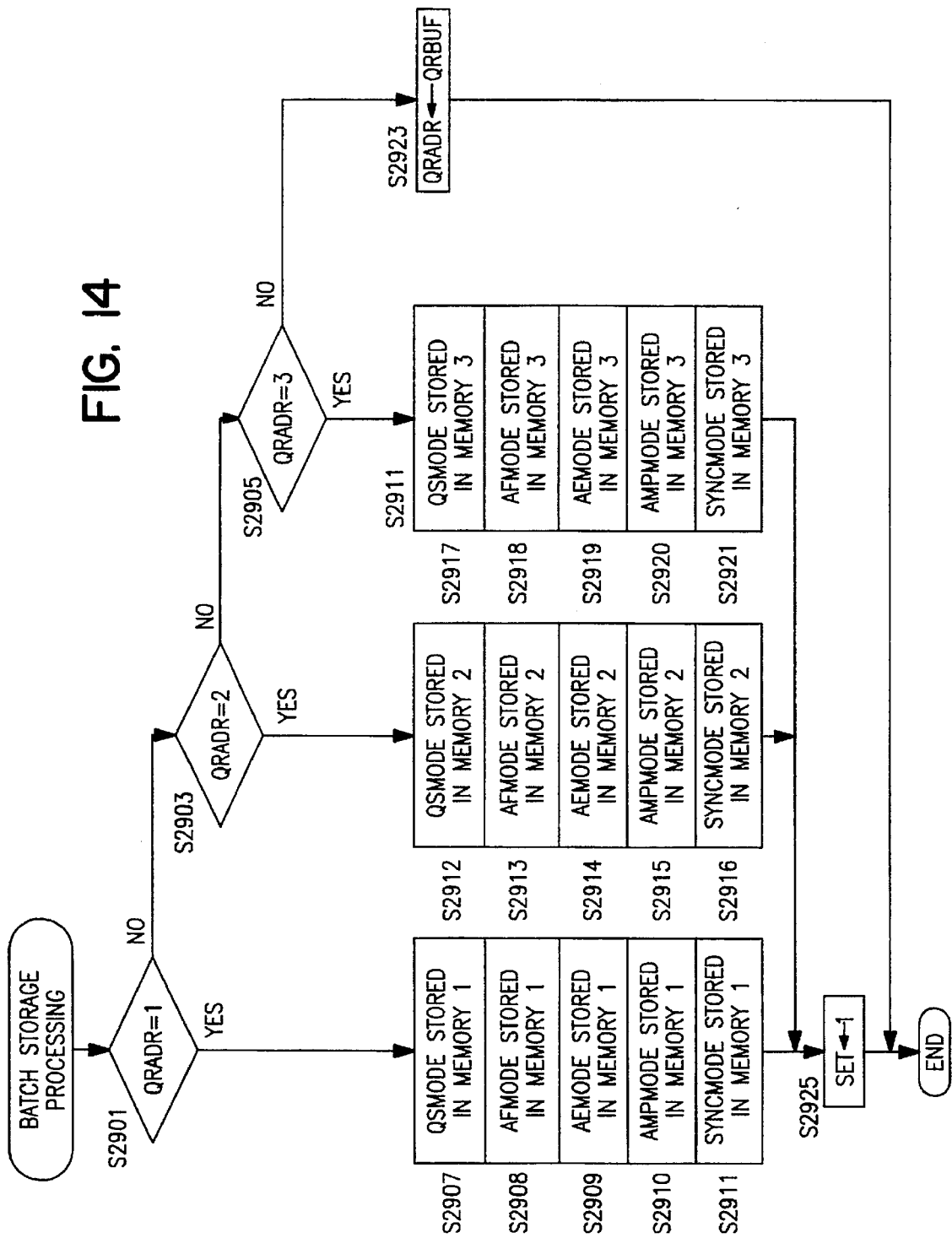
FIG. 14 is the flowchart of a Batch Storage Processing Routine.

Next, the memory batch access processing of Step 1221 and the memory batch storage processing of Step 1229 as illustrated in the flowchart of FIG. 8 will be explained with reference to FIGS. 13 and 14. First, with reference to FIG. 13, batch access processing will be explained. MCU 7 first decides whether QRADR is 0 (Step 2801). If QRADR is 0, each parameter is accessed from memory B0 (Step 2808~Step 2812, as illustrated). Immediately after each parameter has been accessed, the read data and the setting values are matched, and then MCU 7 sets a flag SET in the RAM of MCU 7 to 1 (Step 2831).

If in Step 2801 it is determined that the result of QRADR=0 is NO, flow sequentially proceeds through a determination whether QRADR is 1, 2 or 3. Accordingly, MCU 7 accesses each parameter from the corresponding memory and sets the flag SET, which is in the RAM of MCU 7, to 1. If QRADR is 4, MCU 7 cancels data access and stores the photographic information stored in memory QRBUF into QRADR.

Next, batch storage processing will be explained with reference to FIG. 14. First, MCU 7 decides whether QRADR is 1 (Step 2901). If QRADR is 1, each parameter is stored in memory A1 (Step 2907~Step 2911). Immediately after each parameter has been stored, the stored data and the setting values are matched. Next, MCU 7 sets the flag SET to 1 (Step 2925). If the determination from Step 2901 that QRADR=1 is NO, MCU 7 then sequentially decides whether QRADR is 2 or 3. In this way, MCU 7 stores each parameter from the corresponding memory and sets the flag SET to 1. If QRADR is 4, MCU 7 cancels data storage and stores the photographic information stored in memory QRBUF into QRADR.

Figure 9:
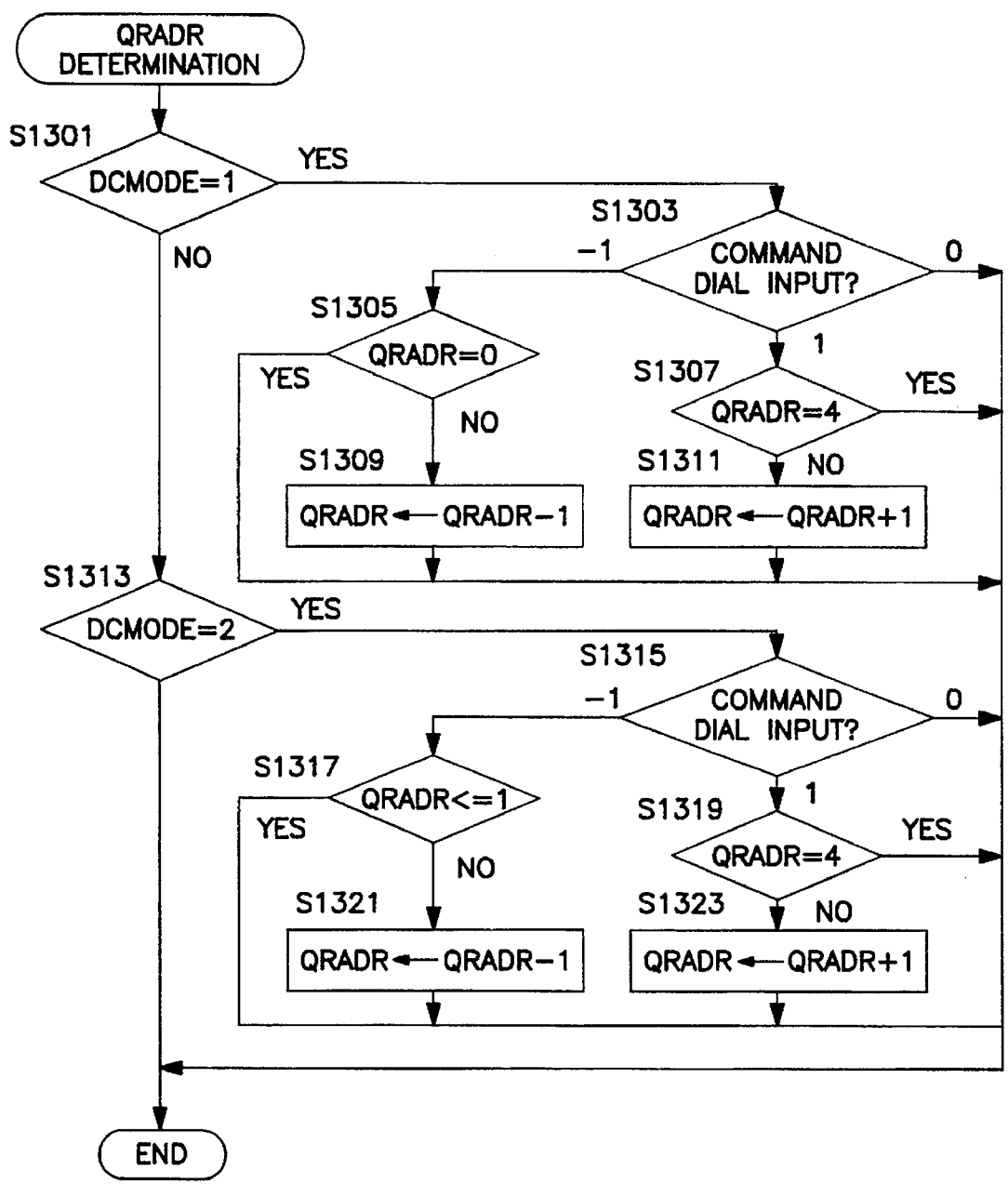
FIG. 9 is a flowchart of the QRADR Determination in FIG. 7.

Returning to FIG. 7, in Step 1103, MCU 7 makes a QRADR determination and decides which memory to use. FIG. 9 explains Step 1103 in detail. In FIG. 9, MCU 7 first decides whether DCMODE is 1, i.e. whether the MCU 7 is accessing data (Step 1301). When MCU 7 has decided in Step 1301 that it is accessing data (DCMODE=1), MCU 7 then decides on the operating condition of command dial 6 (Step 1303). When command dial 6 is operated in a counterclockwise direction (−1 input), MCU 7 decides whether the current QRADR value is 0 (Step 1305). If the current QRADR value is not 0, the result of adding −1 to the current QRADR value is set as the new QRADR value (Step 1309). When the current QRADR value is 0, the subroutine ends without adding −1.

When command dial 6 is operated in the clockwise direction (1 input), MCU 7 decides whether the current QRADR value is 4 (Step 1307). If the current QRADR value is not 4, a value of 1 is added to the current QRADR value and then stored as the new QRADR value (Step 1311). When the current QRADR value is 4, the subroutine is ended without adding 1. MCU 7 also ends the subroutine when it is decided in Step 1303 that command dial 6 is not being operated (0 input). In the same way, MCU 7 also operates the contents of QRADR according to the operating condition of command dial 6 when DCMODE is 2, i.e. during RAM data storage (Step 1313~Step 1323).

Figure 10:
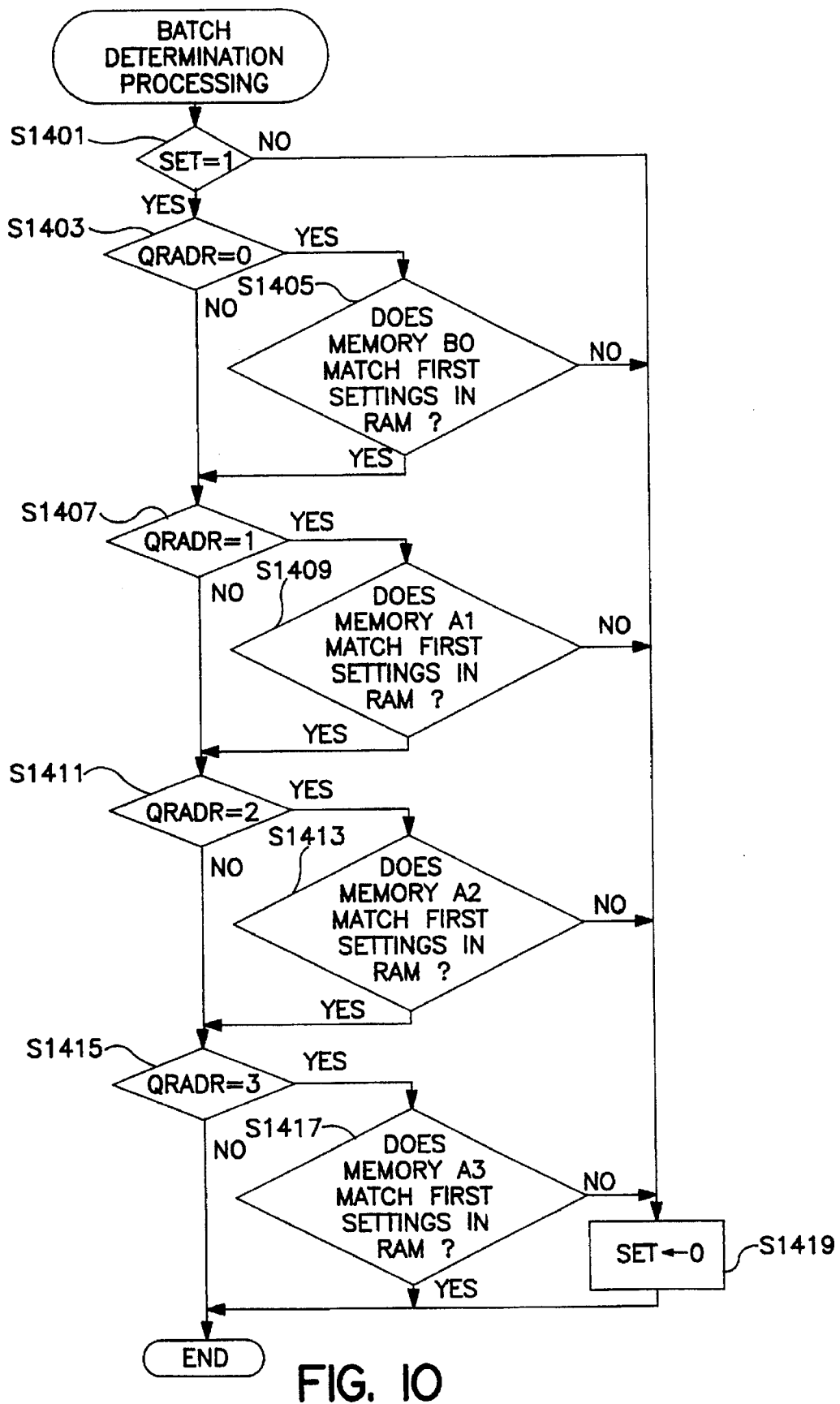
FIG. 10 is a flowchart of the Batch Determination Processing in FIG. 7.

Returning to FIG. 7, MCU 7 performs batch determination processing (Step 1105). FIG. 10 explains Step 1105 in greater detail; therefore, explanation continues below with reference to FIG. 10. In reference to FIG. 10, MCU 7 first decides whether QRADR display section 8 of external LCD panel 5 is in a display condition (Step 1401). When it is decided that QRADR display section 8 is in a display condition, MCU 7 then decides whether QRADR is 0 (Step 1403). When QRADR is 0, MCU 7 checks whether the contents of memory B0 and the contents stored in the first information settings in the RAM match (Step 1405). Accordingly, because the main flowchart in FIG. 6 is repeatedly executed, and the photographic information settings are changed, the contents of the first information settings in the RAM and the contents of the accessed memory are compared in Step 1405.

When the contents of memory B0 and the contents stored in the first information settings in the RAM match, MCU 7 proceeds to Step 1407. When the contents of memory B0 and the contents stored in the first information settings in the RAM do not match, the current display contents of external LCD panel 5 and the contents of memory B0 also differ. Accordingly, the display of QRADR display section 8 is turned off with a value of 0 put into SET (Step 1419).

Below, in the same way, for the cases wherein QRADR is 1~3, MCU 7 decides whether the contents stored in the first information settings in the RAM and the contents of the accessed memory match. Upon a determination of a match, MCU 7 turns off the display of QRADR display section 8 (Step 1407~Step 1419). MCU 7 sets the value of SET to 0 in Step 1419 such that when the batch determination processing loop is processed, as the main flowchart (FIG. 6) is repeatedly executed, only a determination of Step 1401 is required. This improves processing performance.

Returning to FIG. 7, as mentioned above, MCU 7 uses operation buttons 14 and 15 and command dial 6 to perform individual function settings (Step 1107), and ends the flowchart in FIG. 7.

Figure 11:
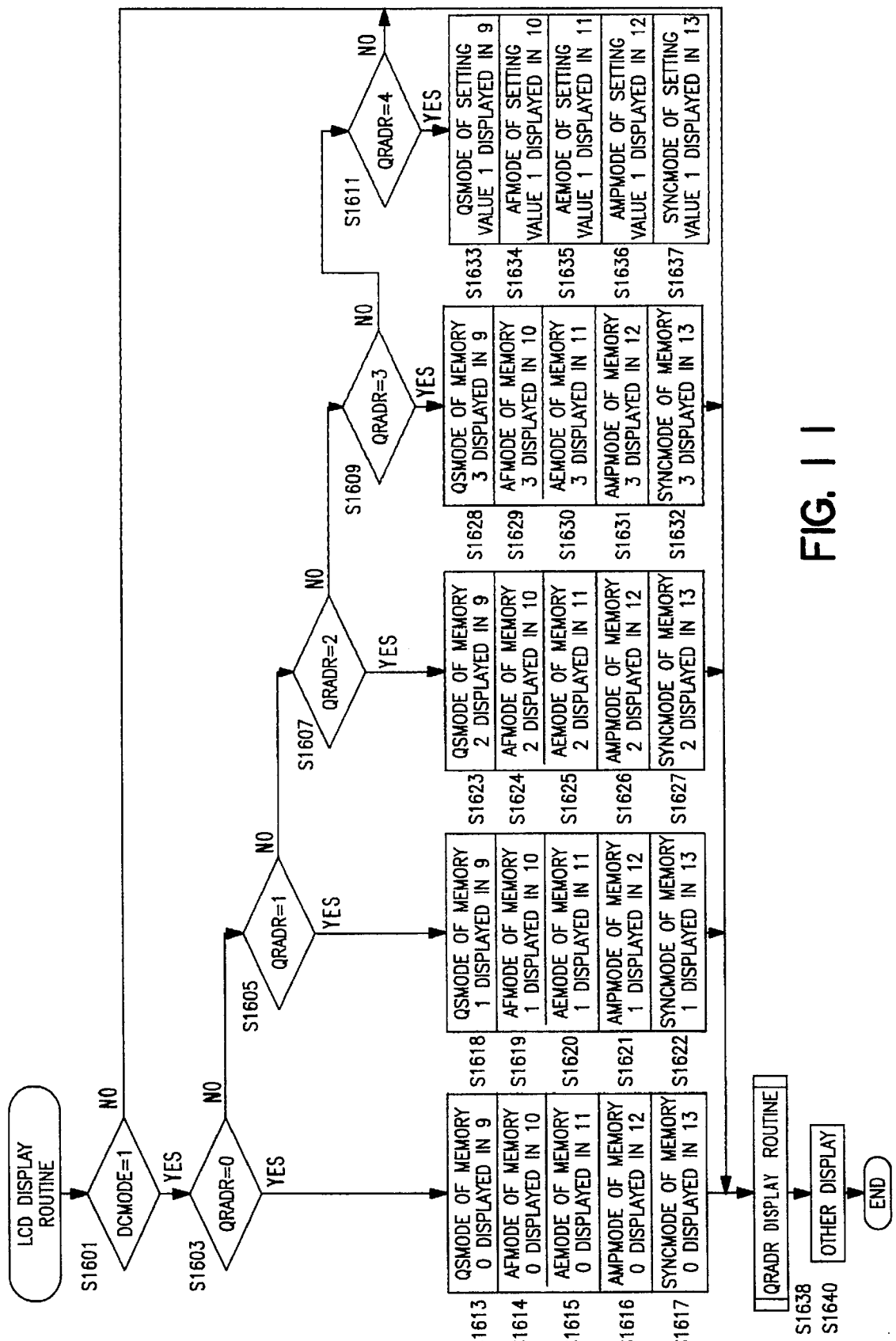
FIG. 11 is a flowchart of the LCD Display Routine of the Main Routine in FIG. 6.

FIG. 11 is a subroutine relating to a display of Step 1007 of the main flowchart in FIG. 6. Accordingly, the explanation will continue below while following FIG. 11. MCU 7 first decides whether DCMODE=1, i.e. whether MCU 7 is accessing a memory (Step 1601). When DCMODE=1 and MCU 7 is accessing a memory, MCU 7 next decides whether the currently accessed memory is memory B0 (Step 1603). When the currently accessed memory is memory B0, MCU 7 displays the contents of memory B0 in feed mode display section 9 through synchro mode display section 13 of external LCD panel 5. This is shown respectively by way of Step 1613~Step 1617.

In the same way, MCU 7 provides a number of displays which correspond to the memory currently being accessed in feed mode display section 9 through synchro mode display section 13 of external LCD panel 5 (Step 1618~Step 1632).

When the value of QRADR is 4, MCU 7 determines that neither memories A1~A3 nor memory B0 is being accessed. Accordingly, MCU 7 provides displays which correspond to the photographic information currently stored in the first settings in the RAM, by way of feed mode display section 9 through synchro mode display section 13 of external LCD panel 5 (Step 1633~Step 1637). After display of external LCD panel 5 has been completed or when it has been determined in Step 1601 that the memory is not currently being accessed, MCU 7 proceeds to the QRADR display routine (Step 1638).

Figure 12:
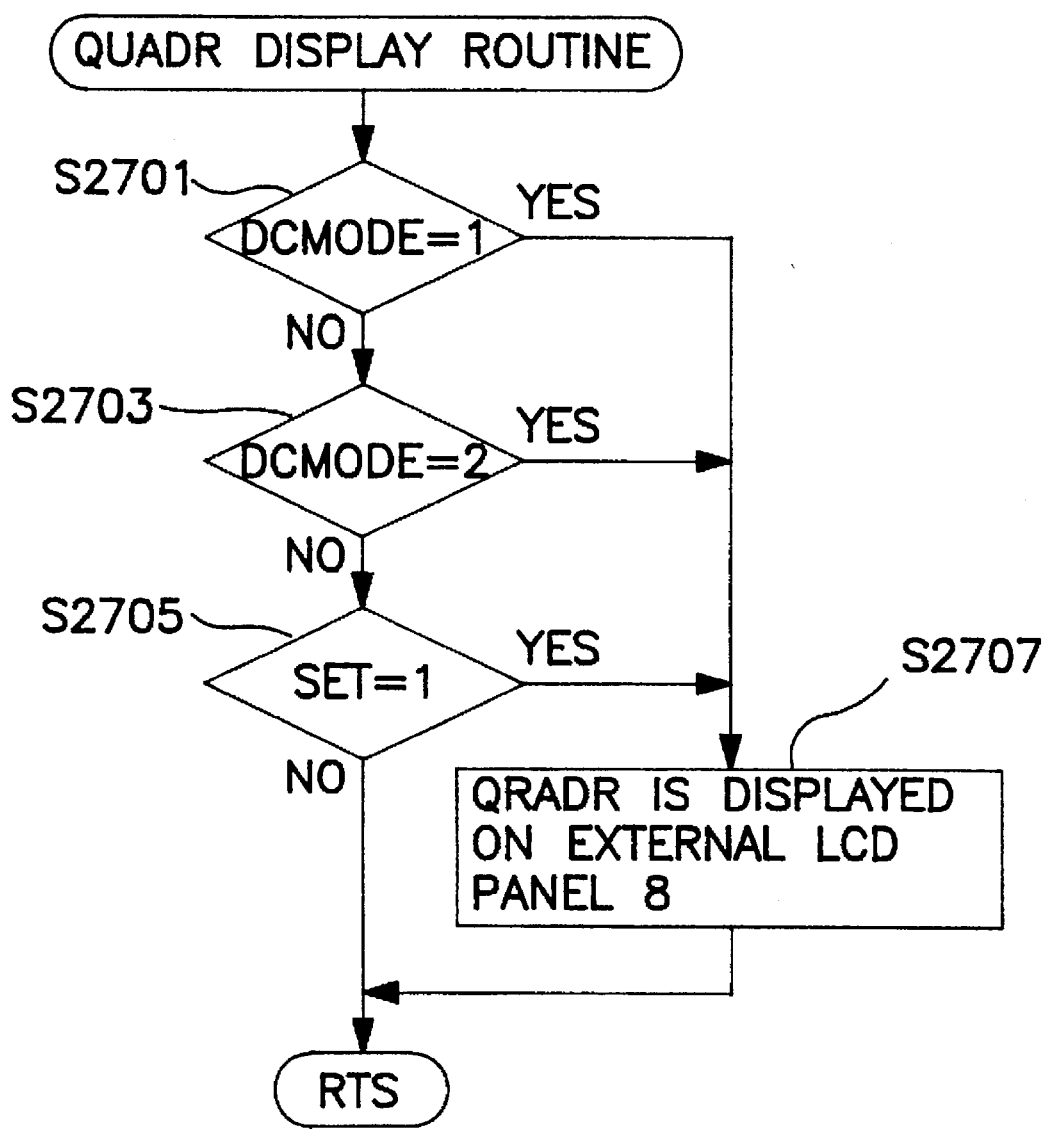
FIG. 12 is a flowchart of a QRADR Display Routine.

FIG. 12 is a flowchart of a subroutine of Step 1638, i.e. the QRADR display routine. Accordingly, with reference to FIG. 12, MCU 7 first decides in Step 2701 whether DCMODE=1, i.e. memory is being accessed. When DCMODE is 1, MCU 7 provides a display corresponding to the accessed memory in QRADR display section 8 of external LCD panel 5 (Step 2707).

When DCMODE is not 1, MCU 7 next decides whether DCMODE is 2, i.e. whether the memory is being updated (Step 2703). When DCMODE is 2, MCU 7 provides a display corresponding to the memory used for storage in the QRADR display section 8 of external LCD panel 5 (Step 2707). When DCMODE is not 2, MCU 7 decides whether the settings of the photographic information have been changed (Step 2705). If the settings of the photographic information have not been changed, MCU 7 provides a display which corresponds to the memory stored in the first information settings in the RAM in QRADR display section 8 of external LCD panel 5 (Step 2707).

When MCU 7 has decided in Step 2705 that the settings of the photographic information have been changed or when it has ended the processing of Step 2707, MCU 7 ends the subroutine in FIG. 12. Returning to FIG. 11, MCU 7 displays the photographic information stored in the second information settings in the RAM on external LCD panel 5 in Step 1640.

In accordance with the above, the camera setting and display device provides a display relating to the storage area of the storage device in a number of display sections including a first display section and a second display section. Accordingly, the photographer is able to perform photography after checking which storage area is being used. Also, if the photographer checks only the second display section, the display of the first display section need not be checked. For this reason, the photographer is able to take photographs as intended without missing photographic opportunities.

According to the camera setting and display device above, one can simply check if the photographic information has changed by checking whether the display of the second display section is displayed. For this reason, one can be aware that the photographic information has been changed, and be in a position to avoid taking photographs which are contrary to one's intentions. The camera setting and display device also stores multiple information as one set of information, so that operability can be improved while storing photographic information that is frequently changed, in the first storage section.

According to an embodiment of the present invention, a camera setting and display device can both access photographic information and cancel access of the photographic information through an operation member to improve operability. To this end, the multiple photographic information is used as information which changes frequently. Photographic information may also be stored and storage may be cancelled by way of a second operation member. Information which changes frequently is also used as the multiple photographic information to improve operability.

According to an embodiment of the present invention and in reference to FIG. 3, a camera setting and display device provides a number of display sections 9–13 which may relate to a storage area of MCU 7. Camera 20 also includes QRADR display section 8 so that a photographer is able to perform photography after checking which storage area is being used. Moreover, if the photographer only checks QRADR display section 8, the display symbols of the first display sections 9–13 need not be checked.

Camera 20 does not provide a display of QRADR display section 8 when the photographic information has changed, so a photographer can easily determine whether the photographic information has changed. To this end multiple information is stored as one set of information by shutter release button 3. The photographic information which is frequently changed is stored in the first storage section. Accordingly, a photographer is able to access photographic information and to cancel access through command dial 6 to improve operability. A photographer is also able to store photographic information and cancel storage through command dial 6. This enables multiple information to be readily changed by a photographer.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera setting and display device comprising:
   a display panel to display a plurality of photographic information sections and an identification information section, wherein each photographic information section has a plurality of selectable display symbols and the identification information section has a plurality of identification symbols;
   a plurality of setting members which cooperate to select a display symbol from each photographic information section and to group the selected display symbols as a set;
   a storage device to store the set of selected display symbols in a corresponding storage area; and
   a control device to control the identification information section of said display panel to display an identification symbol corresponding to the set of selected display symbols and to change the identification symbol when a display symbols of the set of selected display symbols is changed by said setting members.

2. A camera setting and display device as in claim 1, wherein the storage device includes a first storage area that stores multiple photographic information as one set of information, and a second storage area that stores multiple photographic information, which differs from the multiple photographic information as a second set of information.

3. The camera setting and display device as in claim 2, wherein a first type of photographic information is contained in the first storage area, said first type of information selected from among photographic information relating to film feed, focusing, exposure, photometry, and flash photography.

4. A camera setting and display device comprising:
   a storage device to store photographic information as a plurality of sets of photographic information, wherein each set of photographic information is stored with corresponding identification information;
   a first operation member to generate an indication signal which indicates a particular set of photographic information from said stored sets of photographic information;
   a second operation member to generate a first signal when moved to a specified position and a second signal when not moved to the specified position, wherein said first and second operation members cooperate to change photographic information within the particular set of photographic information;
   a control device to select the particular set of photographic information from the stored sets of photographic information in response to the first signal and the indication signal and to cancel selection upon receiving the second signal; and
   a display device to display the selected set of photographic information and the corresponding identification information, wherein the corresponding identification information is not displayed when the photographic information is changed by said first and second operation members;
   whereby the displayed set and the displayed identification information remain consistent.

5. A camera setting and display device as in claim 4, wherein:
   the first operation member is a push switch and the second operation member is a dial switch that can be rotated.

6. A camera setting and display device as in claim 4, wherein:

the multiple photographic information includes at least one of photographic information relating to film feed, focusing, photometry, and flash photography.

7. A camera setting and display device comprising:

a storage device to store multiple photographic conditions as a set of information with each set of information being identified by corresponding identification information;

an operation member to permit storage of the set of information in said storage device, to permit retrieval of the set of information from said storage device, and to change the photographic conditions within the retrieved set of information;

a control device to store and retrieve the set of information if permitted by the operation member;

a display device to display the set of information and the corresponding identification information after retrieval from the storage device, and to not display the identification information if a photographic condition within the retrieved set is changed by said operation member;

whereby the displayed set and the displayed identification information remain consistent.

8. A camera setting and display device according to claim 7, wherein:

said operation member is a push switch.

9. A camera setting and display device according to claim 7, wherein the multiple photographic conditions comprise one of photographic information relating to film feed, focusing, photometry, and flash photography.

10. A camera setting and display device comprising:

a storage device to store sets of photographic information sections, wherein each stored set includes a selected symbol from each photographic information section;

a control device to select a stored set from said storage device for display;

a first display to display the selected set;

a second display to display identification information corresponding to the selected set; and an operation member to designate and change a symbol in the displayed set;

wherein said control device controls the second display to not display the identification information corresponding to the selected set when the operation member changes the designated symbol in the displayed set.

11. A camera setting and display device as in claim 10, further comprising:

a second member to cooperate with said operation member to select and change a symbol of a displayed section in the displayed set.

12. A camera setting and display device as in claim 11, wherein:

said operation member is a push switch and said second member is a rotatable dial switch.

13. A camera setting and display device as in claim 12, wherein:

the contents of the storage device corresponding to the displayed symbols may be changed by rotating said dial switch when said push switch is continually depressed.

14. A camera setting and display device as in claim 12, wherein:

said dial switch rotates to select a symbol from the plurality of display symbols by blinking the selected display symbol.

15. A camera setting and display device as in claim 14, wherein:

said dial switch outputs a first signal when rotated clockwise, a second signal when rotated counterclockwise, and a third signal when not rotated; and said control device controls said display device to selectively cycle through the displayed symbols on said display device in response to received signals from said dial switch.

16. A camera setting and display device as in claim 10, wherein said storage device further comprises:

a first storage area that stores first multiple photographic information as a first single set of information; and a second storage area that stores second multiple photographic information different from said first multiple photographic information as a second single set of information.

17. A camera setting and display device as in claim 16, wherein at least one type of the first set of photographic information stored in the first storage area relates to film feed, focusing, exposure, photometry, and flash photography.

* * * * *